United States Patent
Hayashi (10) Patent No.: US 8,739,748 B2
(45) Date of Patent: Jun. 3, 2014

(54) VALVE TIMING ADJUSTER

(75) Inventor: Masashi Hayashi, Okazaki (JP)

(73) Assignee: Denso Corporation, Kariya (JP)

( * ) Notice: Subject to any disclaimer, the term of this patent is extended or adjusted under 35 U.S.C. 154(b) by 734 days.

(21) Appl. No.: 13/015,854

(22) Filed: Jan. 28, 2011

(65) Prior Publication Data

US 2011/0185994 A1 Aug. 4, 2011

(30) Foreign Application Priority Data

Jan. 29, 2010 (JP) .................................. 2010-18463

(51) Int. Cl.
*F01L 1/34* (2006.01)
*F02D 13/00* (2006.01)

(52) U.S. Cl.
USPC ................ 123/90.17; 123/179.16; 123/347

(58) Field of Classification Search
CPC ...... B60W 30/192; F02D 41/062; F01L 1/34; F01L 1/3442; F01L 2001/34453; F01L 2001/34473; F01L 2001/34483
USPC ........... 123/90.15, 90.17, 179.3, 179.16, 347; 701/110, 112, 113
See application file for complete search history.

(56) References Cited

U.S. PATENT DOCUMENTS

| | | | |
|---|---|---|---|
| 7,198,012 B2 * | 4/2007 | Suga et al. | 123/90.17 |
| 7,909,008 B2 * | 3/2011 | Inoue et al. | 123/90.17 |
| 8,205,589 B2 * | 6/2012 | Katayama et al. | 123/179.3 |
| 8,215,272 B2 * | 7/2012 | Takemura et al. | 123/90.15 |
| 2009/0183706 A1 * | 7/2009 | Miwa et al. | 123/179.3 |
| 2012/0291750 A1 * | 11/2012 | Yokoyama et al. | 123/347 |

FOREIGN PATENT DOCUMENTS

| | | |
|---|---|---|
| JP | 2003-214123 | 7/2003 |
| JP | 2007-83253 | 4/2007 |
| JP | 2007-85253 | 4/2007 |

* cited by examiner

*Primary Examiner* — Mahmoud Gimie
*Assistant Examiner* — David Hamaoui
(74) *Attorney, Agent, or Firm* — Nixon & Vanderhye PC (57) ABSTRACT

A valve timing adjuster adjusts timing of opening and closing an intake valve or an exhaust valve by changing a phase between a drive shaft and a driven shaft. The valve timing adjuster includes a housing, a vane rotor, an urging member, a regulating member, and a control unit. The control unit controls rotation of an electric motor that rotates the drive shaft. When an internal combustion engine stops in a state, where the regulating member is positioned out of a bore, the control unit restarts the engine by controlling the electric motor in the following manner. Firstly, the motor is controlled to rotate at a first rotational speed, which is a relatively high speed and subsequently, the motor is quickly changed to rotate at a second rotational speed, which is a relatively low speed.

5 Claims, 6 Drawing Sheets

VALVE TIMING ADJUSTER

CROSS REFERENCE TO RELATED APPLICATION

This application is based on and incorporates herein by reference Japanese Patent Application No. 2010-18463 filed on Jan. 29, 2010.

BACKGROUND OF THE INVENTION

1. Field of the Invention

The present invention relates to a valve timing adjuster that adjusts timing of opening and closing at least one of an intake valve and an exhaust valve of an internal combustion engine (hereinafter referred to as an "engine").

2. Description of Related Art

A conventional hydraulic valve timing adjuster is known to adjust timing of opening and closing an intake valve or an exhaust valve of an engine in a following manner. The valve timing adjuster is known to have a regulating member that is fittable with both of a vane rotor and a housing such that rotation of the vane rotor relative to the housing is regulated when oil pressure is not supplied to the adjuster during the engine start. In the valve timing adjuster, by fitting the regulating member with the housing, a phase difference between the vane rotor and the housing (or in other words, a phase difference between a driven shaft and a drive shaft) is maintained at a certain phase difference that enables the engine to start. Normally, before the engine is stopped, the vane rotor is rotated to a position for fitting the regulating member with the housing. As a result, the regulating member is reliably fitted with the housing, and thereby the vane rotor and the housing are positioned to be ready for the engine start in the next operation.

However, in case of a sudden stop of the engine, such as a case of an engine stall, the regulating member is positioned out of the fitting bore of the housing. In other words, in case of the sudden engine stop, the phase difference between the driven shaft and the drive shaft may indicate a state that is not appropriate for the engine start. In the above condition, during the next engine start, the engine may not be started. In order to address the above failure in restarting the engine, there is proposed a certain valve timing adjuster. In the above adjuster, an intermediate position or an advance side is set as a fitting phase, at which the vane rotor is fittable with the regulating member. Also, a return spring is provided for urging the vane rotor in the advance direction. As a result, when the engine suddenly erroneously stops, the urging torque of the return spring rotates the vane rotor to the fitting phase.

However, in the attempt to restart the engine, the urging torque of the return spring may not be able to move the vane rotor to the fitting phase, and thereby it may be impossible to start the engine disadvantageously. The reason of the above disadvantage will be described below. Typically, during the restarting of the engine, a starter motor is used for the cranking of the engine, and the rotational speed of the engine (drive shaft) may be normally about 100 to 500 rpm. In the above slow rotation operation, because of "the increase of a contact pressure at each slide part" or "difficulty in sufficiently maintaining oil film", the average cam torque, which includes the friction of valve system, may increase to be greater than the urging torque of the return spring. As a result, the urging torque of the return spring may not be able to successfully move the vane rotor to the fitting phase disadvantageously.

In order to address the above disadvantages, a valve timing adjuster described in JP-A-2003-214123 has a mechanism (retard rotation regulating mechanism). At the time of the engine stall, the retard rotation regulating mechanism regulates the rotation of the vane rotor within a certain phase range, in which the vane rotor is fittable with the regulating member, and the retard rotation regulating mechanism prevents the vane rotor from rotating further in the retard direction over the certain phase range. However, the retard rotation regulating mechanism of the valve timing adjuster of JP-A-2003-214123 has a complex configuration, and thereby manufacturing cost of the adjuster is increased disadvantageously.

SUMMARY OF THE INVENTION

The present invention is made in view of the above disadvantages. Thus, it is an objective of the present invention to address at least one of the above disadvantages.

To achieve the objective of the present invention, there is provided a valve timing adjuster that adjusts timing of opening and closing at least one of an intake valve and an exhaust valve by changing a phase between a drive shaft of an internal combustion engine and a driven shaft that is driven by a driving force of the drive shaft, wherein the driven shaft opens and closes the at least one of the intake valve and the exhaust valve. The valve timing adjuster includes a housing, a vane rotor, an urging member, a regulating member, and a control unit. The housing is rotatable synchronously with one of the drive shaft and the driven shaft, and the housing has a receiving chamber extending over a predetermined angular range in a rotational direction. The vane rotor is rotatable synchronously with the other one of the drive shaft and the driven shaft. The vane rotor has a vane provided at an outer periphery of the vane rotor. The vane divides the receiving chamber into a retard chamber and an advance chamber. The vane rotor is rotatable relative to the housing in a retard direction and an advance direction based on pressure of working fluid supplied to the retard chamber and the advance chamber. The urging member has one end engaged with the vane rotor and has the other end engaged with the housing. The urging member urges the vane rotor in the advance direction relative to the housing. The regulating member is longitudinally reciprocably received within a hole formed at the vane, wherein the regulating member regulates rotation of the vane rotor relative to the housing when the regulating member is fitted into a bore formed at an inner wall of the housing. The control unit is configured to control rotation of an electric motor that rotates the drive shaft. When the internal combustion engine stops in an operational state, where the regulating member is positioned out of the bore, the control unit restarts the internal combustion engine by controlling the electric motor in the following manner. Firstly, the electric motor is controlled to rotate at a first rotational speed, which is a relatively high speed and subsequently, the electric motor is quickly changed to rotate at a second rotational speed, which is a relatively low speed.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Embodiments of the present invention will be described below with reference to accompanying drawings. It should be noted that substantially the same configurations among the multiple embodiments are indicated by the same numerals, and the explanation thereof will be omitted.

First Embodiment

Figure 1:
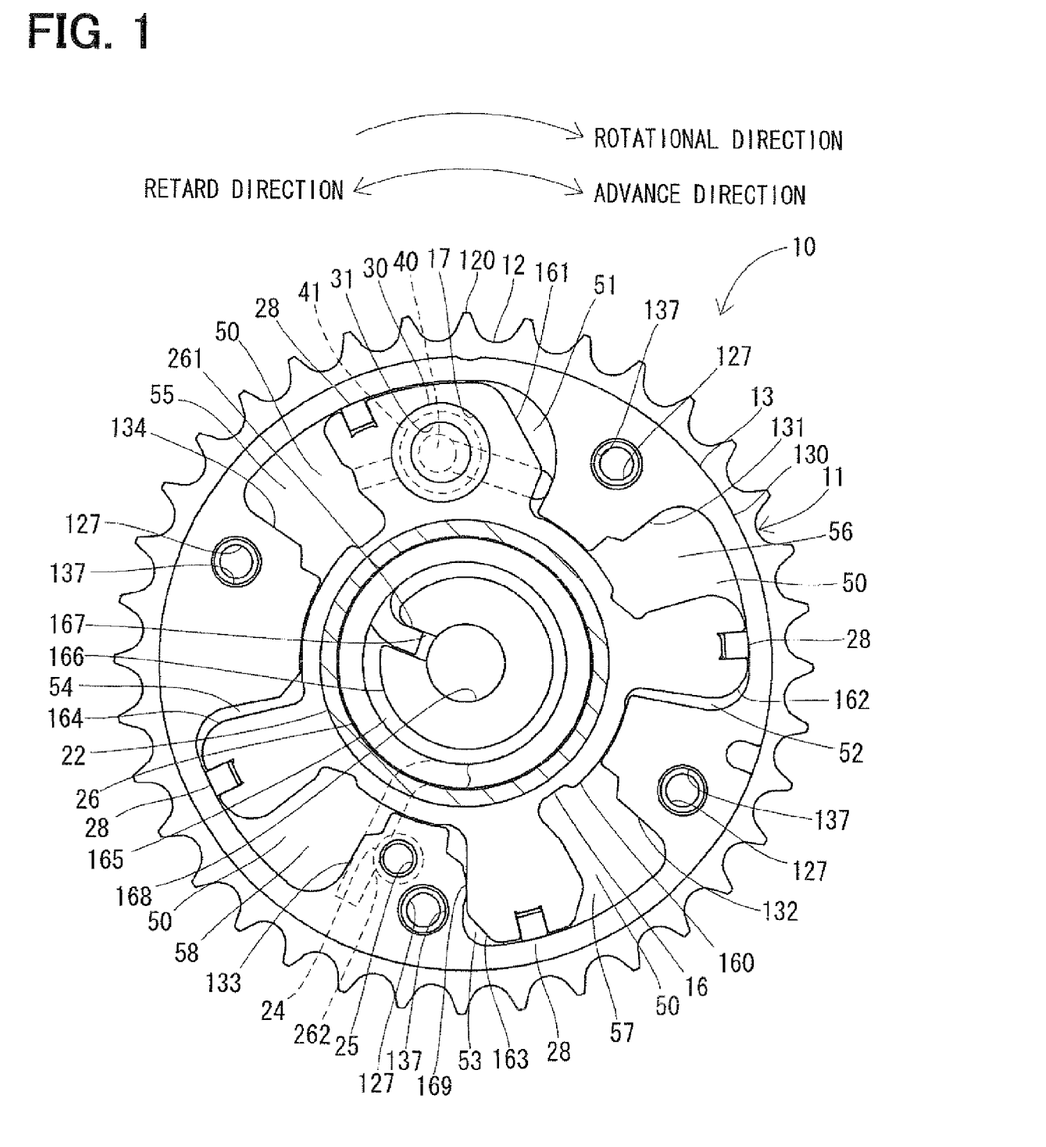
FIG. 1 is a diagram illustrating a valve timing adjuster according to the first embodiment of the present invention, and is a cross-sectional view taken along a line I-I in FIG. 2.
Figure 2:
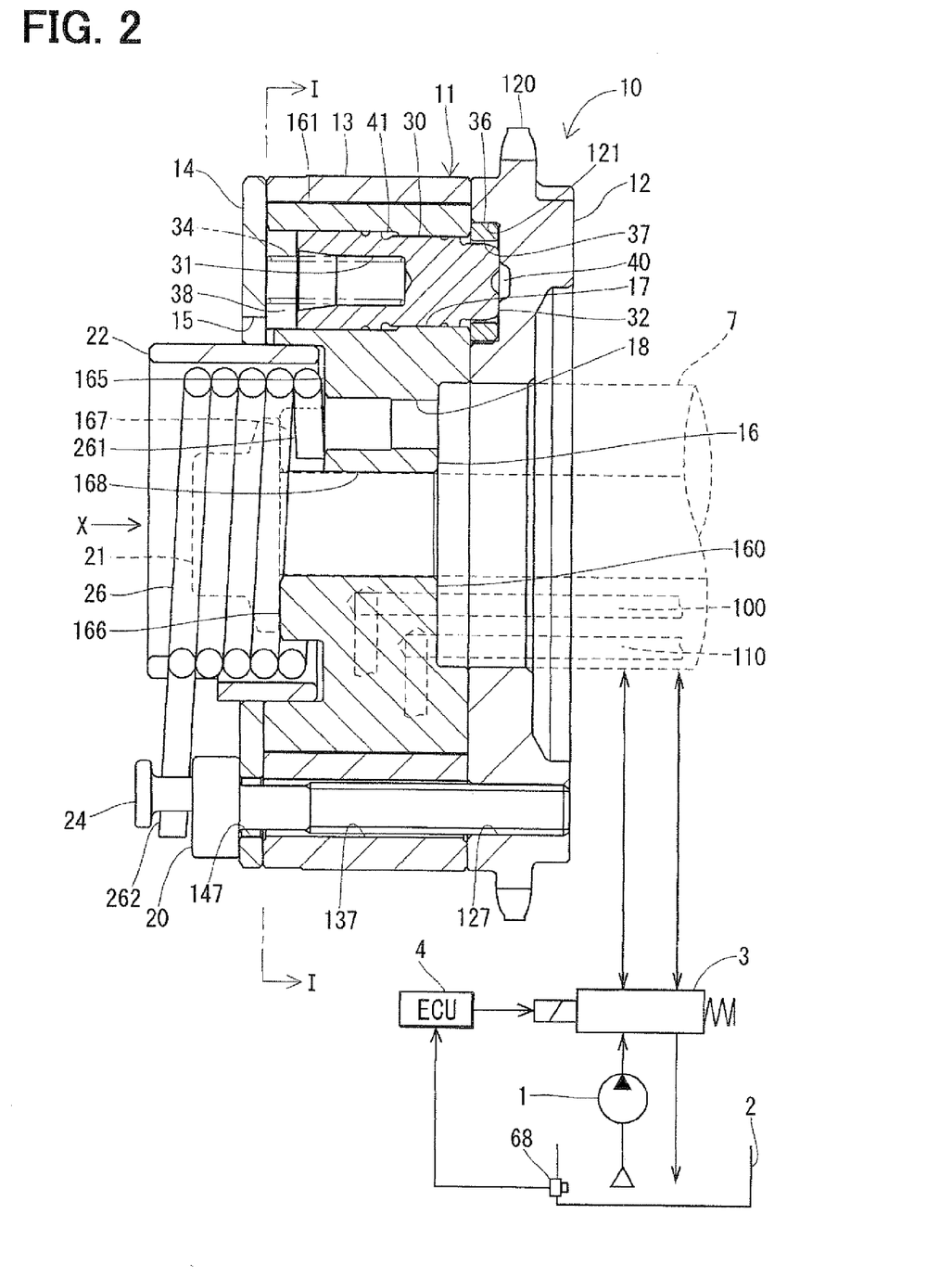
FIG. 2 is a cross-sectional view illustrating the valve timing adjuster of the first embodiment of the present invention.
Figure 3:
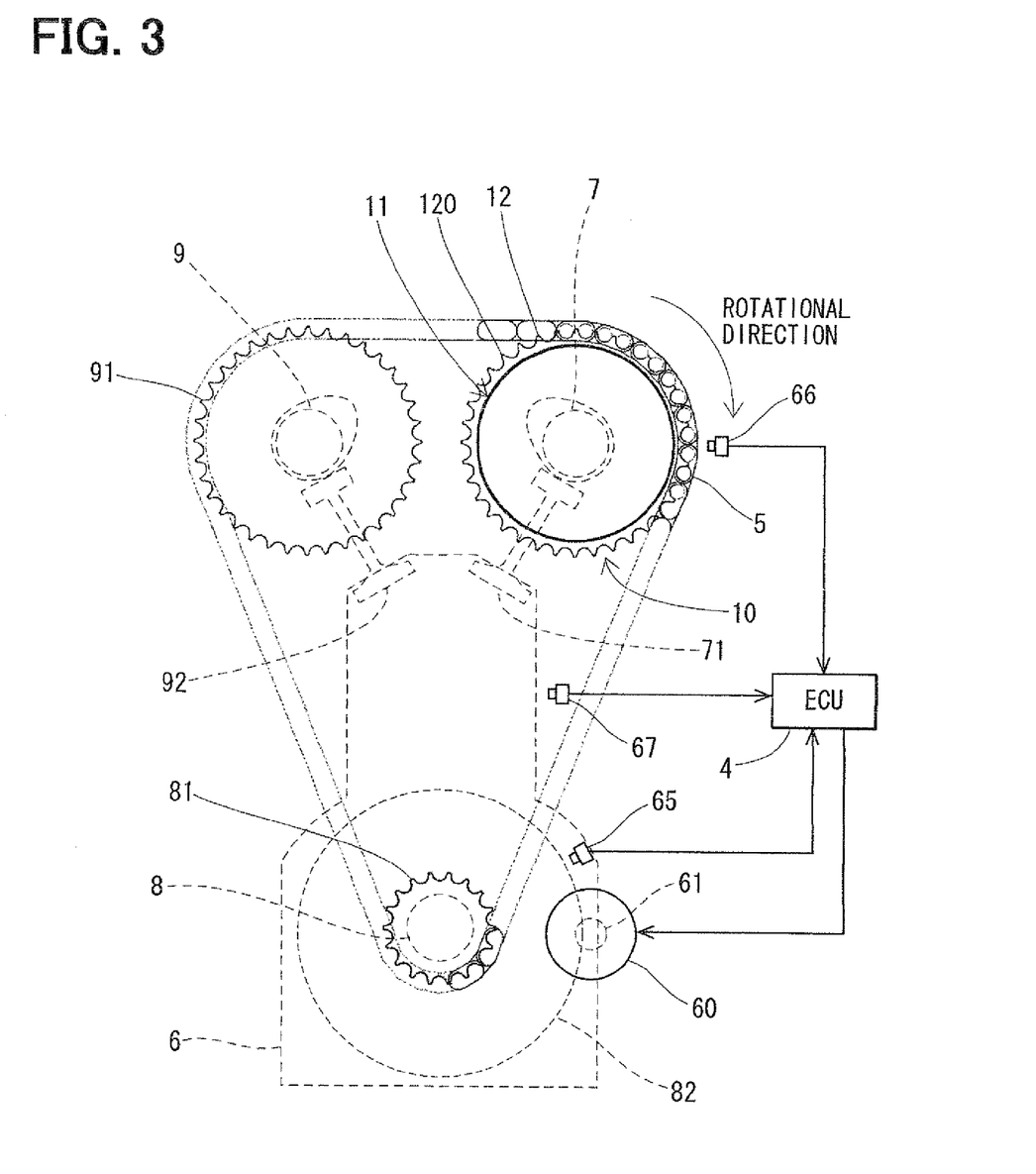
FIG. 3 is a schematic diagram generally illustrating the valve timing adjuster according to the first embodiment of the present invention.

A valve timing adjuster according to the first embodiment of the present invention is shown in FIGS. 1 through 3.

As shown in FIG. 3, a valve timing adjuster 10 of the present embodiment is mounted to a driving force transmission system. In the driving force transmission system shown in FIG. 3, there are provided a chain sprocket 81, a chain sprocket 91, and a chain sprocket 12. The chain sprocket 81 is fixed to a crankshaft 8 that serves as a drive shaft of an internal combustion engine 6 (or the engine 6), and the chain sprocket 91 is fixed to a camshaft 9 that serves as a driven shaft. Also, the chain sprocket 12 is coaxially provided to a camshaft 7. Thus, by installing a chain 5 over the chain sprocket 81, the chain sprocket 91, and the chain sprocket 12, a driving force is transmitted from the crankshaft 8 to the camshafts 7 and 9. The chain sprocket 12 and a vane rotor 16 (described later) constitute the valve timing adjuster 10. The camshaft 7 opens and closes an exhaust valve 71, and the camshaft 9 opens and closes an intake valve 92. The valve timing adjuster 10 of the present embodiment is a hydraulic control adjuster that employs hydraulic oil as working fluid. More specifically, the chain sprocket 12 is connected to the chain 5 and the vane rotor 16 is connected to the camshaft 7 such that the valve timing adjuster 10 adjusts timing of opening and closing the exhaust valve 71.

As shown in FIGS. 1 and 3, the valve timing adjuster 10 includes a housing 11, the vane rotor 16, a spring 26, a stopper pin 30, and an electronic control device (ECU) 4. The spring 26 serves as an urging member, and the stopper pin 30 serves as a regulating member. Also, the ECU 4 serves as a control unit. As shown in FIG. 2, the housing 11 includes the chain sprocket 12, a shoe housing 13, and a front plate 14. For example, each of the chain sprocket 12, the shoe housing 13, and the front plate 14 is made of metal through sintering or forging. Each bolt 20 extends through a bolt hole 147 of the front plate 14 and a bolt hole 137 of the shoe housing 13, and the bolt 20 is threadedly fixed to a bolt hole 127 formed on the chain sprocket 12. As above, the chain sprocket 12, the shoe housing 13, and the front plate 14 are provided coaxially to each other. The chain sprocket 12 constitutes one axial end wall of the housing 11, and the front plate 14 constitutes the other axial end wall of the housing 11. Both of the one axial end wall and the other axial end wall are located on the opposite axial ends of the housing 11. The chain sprocket 12 has a gear 120 provided at an outer periphery of the chain sprocket 12. The housing 11 receives therein the vane rotor 16 that is rotatable relative to the housing 11.

The vane rotor 16 is fixed to the camshaft 7 by inserting a bolt 21 into a bolt hole 168 of the vane rotor 16, and thereby the vane rotor 16 is rotatable synchronously with the camshaft 7. The housing 11, the vane rotor 16, and the camshaft 7 rotates clockwise when observed in a direction of an arrow X in FIG. 2. The rotational direction of the camshaft 7 is referred to as an advance direction hereinafter.

As shown in FIG. 1, the shoe housing 13 has a generally hollow cylindrical peripheral wall 130 and four shoes 131, 132, 133, 134. Each of the shoes 131, 132, 133, 134 projects from an inner peripheral side of the peripheral wall 130, and the shoes 131, 132, 133, 134 are arranged at equal intervals in a circumferential direction (or a rotational direction). A receiving chamber 50 having a fan shape is formed between corresponding adjacent shoes arranged in the rotational direction.

The vane rotor 16 is made of a metal, for example, through sintering or forging. The vane rotor 16 has a hub portion 160 and four vanes 161, 162, 163, 164. The hub portion 160 has an axial end surface that contacts an axial end surface of the camshaft 7. Also, the four vanes 161, 162, 163, 164 are arranged at equal intervals in the circumferential direction, and project from the hub portion 160 in a radially outward direction. The positioning of the vane rotor 16 relative to the camshaft 7 in the rotational direction is achieved by using a positioning pin. For example, the hub portion 160 has a pin hole 18 (see FIG. 2), and the camshaft 7 also has a pin hole (not shown). The positioning pin is fitted into the pin hole 18 of the hub portion 160 and into the pin hole of the camshaft 7 such that the vane rotor 16 is effectively positioned relative to the camshaft 7.

Each vane of the vane rotor 16 has an outer diameter that is smaller than an inner diameter of the peripheral wall 130 of the shoe housing 13. Also, the hub portion 160 of the vane rotor 16 has an outer diameter that is smaller than an inner diameter of each shoe of the shoe housing 13. Therefore, there is formed a clearance having a predetermined distance between the vane rotor 16 and the shoe housing 13.

Each vane is rotatably received within the corresponding receiving chamber 50, and the vane is rotatable relative to the receiving chamber 50. The vane divides the corresponding receiving chamber 50 into a retard hydraulic chamber, which serves as a retard chamber, and an advance hydraulic chamber, which serves as an advance chamber. The arrows shown in FIG. 1 indicate the retard direction and the advance direction of the vane rotor 16 relative to the housing 11. The camshaft 7 and the vane rotor 16 are rotatable relative to the housing 11 and are coaxially provided to the housing 11.

More specifically, a retard hydraulic chamber 51 is formed between the shoe 131 and the vane 161, a retard hydraulic chamber 52 is formed between the shoe 132 and the vane 162, a retard hydraulic chamber 53 is formed between the shoe 133 and the vane 163, and a retard hydraulic chamber 54 is formed between the shoe 134 and the vane 164. Also, an advance hydraulic chamber 55 is formed between the shoe 134 and the vane 161, and an advance hydraulic chamber 56 is formed between the shoe 131 and the vane 162, an advance hydraulic chamber 57 is formed between the shoe 132 and the vane 163, and an advance hydraulic chamber 58 is formed between the shoe 133 and the vane 164.

As shown in FIG. 2, the camshaft 7 and the vane rotor 16 define therein a retard oil passage 100 and an advance oil passage 110. Each of the retard hydraulic chambers receives hydraulic oil through the retard oil passage 100, and each of the advance hydraulic chamber receives hydraulic oil through the advance oil passage 110. The supply of hydraulic oil into both of the oil passages 100, 110, and the drain of hydraulic oil through both of the oil passages 100, 110 are changed in order to rotate the vane rotor 16 relative to the housing 11. As a result, it is possible to adjust the phase difference of the camshaft 7 relative to the crankshaft 8.

The vane rotor 16 has a recess 165 at an end surface of the hub portion 160 opposite from the camshaft 7. The recess 165 has a generally circular ring shape that is recessed relative to the end surface toward the camshaft 7. A bush 22 having a generally hollow cylindrical shape is fitted into the recess 165, and the bush 22 is provided generally coaxially to the vane rotor 16. The vane rotor 16 has a protrusion 166 within the recess 165. In other words, the protrusion 166 is provided at a position radially inward of the bush 22. More specifically, the protrusion 166 has a generally circular ring shape and projects in a direction away from the camshaft 7. Also, the protrusion 166 has a groove 167 that extends from an outer peripheral edge in a radially inward direction.

A spring pin 24 extends through the front plate 14 and is fixedly press-fitted into a press-fit hole 25 formed at a shoe 133 of the shoe housing 13 (see FIG. 1). The spring 26 serving as an urging member is received within the bush 22. The spring 26 has one end portion 261 engaged with the groove 167 of the vane rotor 16 and has the other end portion 262 engaged with the spring pin 24 of the housing 11. A biasing force of the spring 26 functions as a torque that rotates the vane rotor 16 relative to the housing 11 in the advance direction.

The cam torque, which the camshaft 7 receives from the exhaust valve 71 when driving the exhaust valve 71, fluctuates in a positive direction and a negative direction. More specifically, the positive direction of the cam torque indicates a retard direction of the vane rotor 16 relative to the housing 11, and a negative direction of the cam torque indicates an advance direction of the vane rotor 16 relative to the housing 11. An average of the cam torque ("average cam torque") is applied in the positive direction (or the retard direction).

Each seal member 28 is made of, for example, resin, and is fitted with an outer peripheral wall of each vane as shown in FIG. 1. The seal member 28 is urged against an inner peripheral wall of the shoe housing 13 by a biasing force of the respective leaf spring. Due to the above, it is possible to prevent the leakage of hydraulic oil to the hydraulic chambers through a gap between the outer peripheral wall of each vane and the inner peripheral wall of the shoe housing 13.

As shown in FIG. 1 and FIG. 2, the stopper pin 30 serving as a regulating member has a cylindrical cup shape and extends through the vane 161, and is reciprocably displaceably received within a hole 17. For example, the hole 17 is formed at the vane 161 and extends through the vane 161 in the rotation axis direction. The stopper pin 30 has a receiving hole 31 that receives therein a spring 34. The spring 34 has one end engaged with the front plate 14, and has the other end engaged with a bottom of the receiving hole 31 of the stopper pin 30.

A press-fit hole 121 is formed at an end surface of the chain sprocket 12 adjacent the vane rotor 16 (or in other words, an internal wall surface of the housing 11). A ring 36 is press fitted into the press-fit hole 121 and has a bore 37 that is fittable with an end portion 32 of the stopper pin 30. In other words, the bore 37 is formed at an inner wall of the housing 11 and opens to the vane rotor 16. The spring 34 urges the stopper pin 30 toward the ring 36. It should be noted that the bore 37 of the ring 36 has an inner diameter greater than an outer diameter of the end portion 32 of the stopper pin 30.

In a state shown in FIG. 2, where the stopper pin 30 is fitted into the bore 37 of the ring 36, the vane rotor 16 is restricted from rotating relative to the housing 11. The stopper pin 30 is fitted into the ring 36 at a predetermined angle position, which corresponds to a certain phase (starting phase) of the camshaft 7 relative to the crankshaft 8, and which is suitable for starting the engine 6. For example, in the valve timing adjuster 10 for the exhaust valve of the present embodiment, the above starting phase corresponds to a full advance position. A back-pressure chamber 38 is provided in the hole 17 on a side of the stopper pin 30 opposite from the ring 36. The back-pressure chamber 38 is communicated with a communication hole 15 formed at the front plate 14 when the phase of the camshaft 7 relative to the crankshaft 8 corresponds to the full advance position. In the above operational state, the back-pressure chamber 38 opens to the atmosphere through the communication hole 15. As a result, the stopper pin 30 is not limited from reciprocating at the full advance position.

A first pressure chamber 40 is formed on a side of the ring 36 opposite from the vane rotor 16 and is communicated with the retard hydraulic chamber 51. A second pressure chamber 41 is formed at a peripheral side of the stopper pin 30 and is communicated with the advance hydraulic chamber 55. Oil pressure in the first pressure chamber 40 and the second pressure chamber 41 are applied in the direction for causing the stopper pin 30 to get out of the bore 37 of the ring 36.

Also, the vane 163 has a stopper surface 169 adjacent the shoe 133. The stopper surface 169 contacts the shoe 133 to regulate the rotation of the vane rotor 16 relative to the housing 11 in the advance direction in the operation of the valve timing adjuster 10.

As shown in FIG. 3, a driving force transmission system mounted with the valve timing adjuster 10 of the present embodiment includes a starter motor 60 that serves as an electric motor. A gear 61 is provided to an output shaft of the starter motor 60, and meshes with a gear formed at an outer periphery of a flywheel 82. As shown in FIG. 3, the flywheel 82 is coaxially fixed to the crankshaft 8. As a result, the starter motor 60 rotates the output shaft in order to drive the crankshaft 8. The rotation of the starter motor 60 is controlled by the ECU 4. The rotation control of the starter motor 60 by the ECU 4 will be described later.

Also, as shown in FIG. 2 and FIG. 3, the valve timing adjuster 10 includes a crank angle sensor 65, a cam angle sensor 66, a coolant temperature sensor 67, and an oil temperature sensor 68. The crank angle sensor 65 serves as first detecting means, the cam angle sensor 66 serves as second detecting means, the coolant temperature sensor 67 serves as coolant temperature detecting means, and the oil temperature sensor 68 serves as working fluid temperature detecting means. The crank angle sensor 65, the cam angle sensor 66, the coolant temperature sensor 67, and the oil temperature sensor 68 are all connected to the ECU 4.

The crank angle sensor 65 detects a rotation angle of the crankshaft 8, and outputs to the ECU 4 an electrical signal that indicates the detected value. Due to the above, the ECU 4 is capable of detecting the rotation angle of the crankshaft 8. The cam angle sensor 66 detects a rotation angle of the camshaft 7, and outputs to the ECU 4 an electrical signal that indicates the detected value. Due to the above, the ECU 4 is capable of detecting the rotation angle of the camshaft 7. The coolant temperature sensor 67 detects a temperature of coolant that cools the engine 6, and outputs to the ECU 4 an electrical signal that indicates the detected value. Due to the above, the ECU 4 is capable of detecting the temperature of the coolant. The oil temperature sensor 68 detects a temperature of hydraulic oil that operates the valve timing adjuster 10, and outputs to the ECU 4 an electrical signal that indicates the detected value. Due to the above, the ECU 4 is capable of detecting the temperature of the hydraulic oil.

Next, the normal operation of the valve timing adjuster 10 will be described with reference to FIGS. 1, 2, and 3. It should be noted that FIG. 1 and FIG. 2 illustrate the valve timing adjuster 10 before the starting of the engine. In other words, FIG. 1 and FIG. 2 illustrate the valve timing adjuster 10 while the engine 6 stops.

<During Starting of Engine>

Normally, the stopper pin 30 is received within the bore 37 of the ring 36 while the engine 6 stops.

When an ignition key is turned on, the ECU 4 causes the gear 61 of the starter motor 60 to mesh with the gear of the flywheel 82, and also causes the starter motor 60 to rotate at a predetermined rotational speed. Due to the above, the crankshaft 8, and the camshafts 9 and 7 rotate, and thereby the intake valve 92 and the exhaust valve 71 are opened and closed. In the above, the stopper pin 30 stays within the bore 37 of the ring 36, the phase of the camshaft 7 relative to the crankshaft 8 is maintained at the full advance position that is suitable for starting the engine. As a result, the engine 6 is easily started.

Immediately after the engine 6 has been started, a hydraulic pump 1 has not sufficiently supplied hydraulic oil to the retard hydraulic chambers 51, 52, 53, 54, the advance hydraulic chambers 55, 56, 57, 58, the first pressure chamber 40, and the second pressure chamber 41. As a result, the stopper pin 30 remains engaged with the bore 37 of the ring 36, and the phase of the camshaft 7 relative to the crankshaft 8 is held at the full advance position. Due to the above, it is possible to prevent the vibration of the housing 11 and the vane rotor 16 caused by the cam torque received by the camshaft 7 until hydraulic oil is sufficiently supplied to each of the hydraulic chambers. As a result, it is possible to prevent the noise caused by the collision between the housing 11 and the vane rotor 16.

<After Engine Start>

When the hydraulic pump 1 has sufficiently supplied hydraulic oil after the engine has been started, the stopper pin 30 is brought out of the ring 36 by oil pressure supplied to the first pressure chamber 40 and the second pressure chamber 41. As a result, the vane rotor 16 becomes movable relative to the housing 11. Thus, by controlling oil pressure in each of the retard hydraulic chambers and the advance hydraulic chambers, it is possible to adjust the phase difference of the camshaft 7 relative to the crankshaft 8.

<During Retard Operation>

When the valve timing adjuster 10 is controlled under the retard operation, the ECU 4 controls a drive electric current supplied to a switching valve 3. Due to the above, the switching valve 3 connects the hydraulic pump 1 with the retard oil passage 100, and connects the advance oil passage 110 with an oil pan 2. Hydraulic oil discharged by the hydraulic pump 1 is supplied to the retard hydraulic chambers 51, 52, 53, 54 through the retard oil passage 100. Oil pressure in the retard hydraulic chambers 51, 52, 53, 54 is applied to the vanes 161, 162, 163, 164, and generates torque that urges the vane rotor 16 in the retard direction. In the above case, hydraulic oil in the advance hydraulic chambers 55, 56, 57, 58 is drained to the oil pan 2 through the advance oil passage 110. torque generated by oil pressure in the retard hydraulic chambers 51, 52, 53, 54 rotates the vane rotor 16 relative to the housing 11 in the retard direction against a torque (urging torque) generated by the spring 26 in the advance direction.

<During Advance Operation>

When the valve timing adjuster 10 is controlled under the advance operation, the ECU 4 controls a drive electric current supplied to the switching valve 3. Due to the above, the switching valve 3 connects the hydraulic pump 1 with the advance oil passage 110, and connects the retard oil passage 100 with the oil pan 2. Hydraulic oil discharged by the hydraulic pump 1 is supplied to the advance hydraulic chambers 55, 56, 57, 58 through the advance oil passage 110. Oil pressure in the advance hydraulic chambers 55, 56, 57, 58 is applied to the vanes 161, 162, 163, 164 and generates a torque that urges the vane rotor 16 in the advance direction. In the above case, hydraulic oil in the retard hydraulic chambers 51, 52, 53, 54 is drained to the oil pan 2 through the retard oil passage 100. A resultant force of (a) a torque generated by oil pressure in the advance hydraulic chambers 55, 56, 57, 58 and (b) a torque (urging torque) caused by the restoring force of the spring 26 for rotating the vane rotor 16 in the advance direction rotates the vane rotor 16 relative to the housing 11 in the advance direction.

<During Intermediate Holding Operation>

When the vane rotor 16 reaches a target phase, the ECU 4 controls a duty ratio of the drive electric current supplied to the switching valve 3. Due to the above, the switching valve 3 disconnects the hydraulic pump 1 from the retard oil passage 100 and the advance oil passage 110 in order to prevent the drain of hydraulic oil to the oil pan 2 from the retard hydraulic chambers 51, 52, 53, 54 and the advance hydraulic chambers 55, 56, 57, 58. Thus, the vane rotor 16 is maintained at the target phase.

<During Stopping of Engine>

When the engine stop is commanded during the operation of the valve timing adjuster 10, the vane rotor 16 rotates relative to the housing 11 in the advance direction similarly to the advance operation. The vane rotor 16 rotates in the advance direction until the stopper surface 169 of the vane 163 contacts the shoe 133, and stops at the full advance position. In the above state, the ECU 4 stops the operation of the hydraulic pump 1, and causes the switching valve 3 to connect the advance oil passage 110 with the oil pan 2. Due to the above, pressure in the second pressure chamber 41 decreases, and the stopper pin 30 is displaced toward the ring 36 by a biasing force of the spring 34. As a result, the stopper pin 30 is fitted into the bore 37 of the ring 36.

As above, the valve timing adjuster 10 normally stops the operation after the stopper pin 30 has been fitted into the bore 37 of the ring 36, and is set ready for the next engine start.

The valve timing adjuster 10 of the present embodiment is characterized in the control of the starter motor 60 under an abnormal state. In the present embodiment, the abnormal state indicates, for example, a sudden stop of the engine 6, such as an engine stall, and thereby the stopper pin 30 has been brought out of the bore 37 of the ring 36. When the restart of the engine 6 is attempted in the above abnormal state, the stopper pin 30 may not be fitted into the bore 37 even when the starter motor 60 is rotated by a normal rotational speed. As a result, it may be impossible to start the engine 6.

Figure 4:
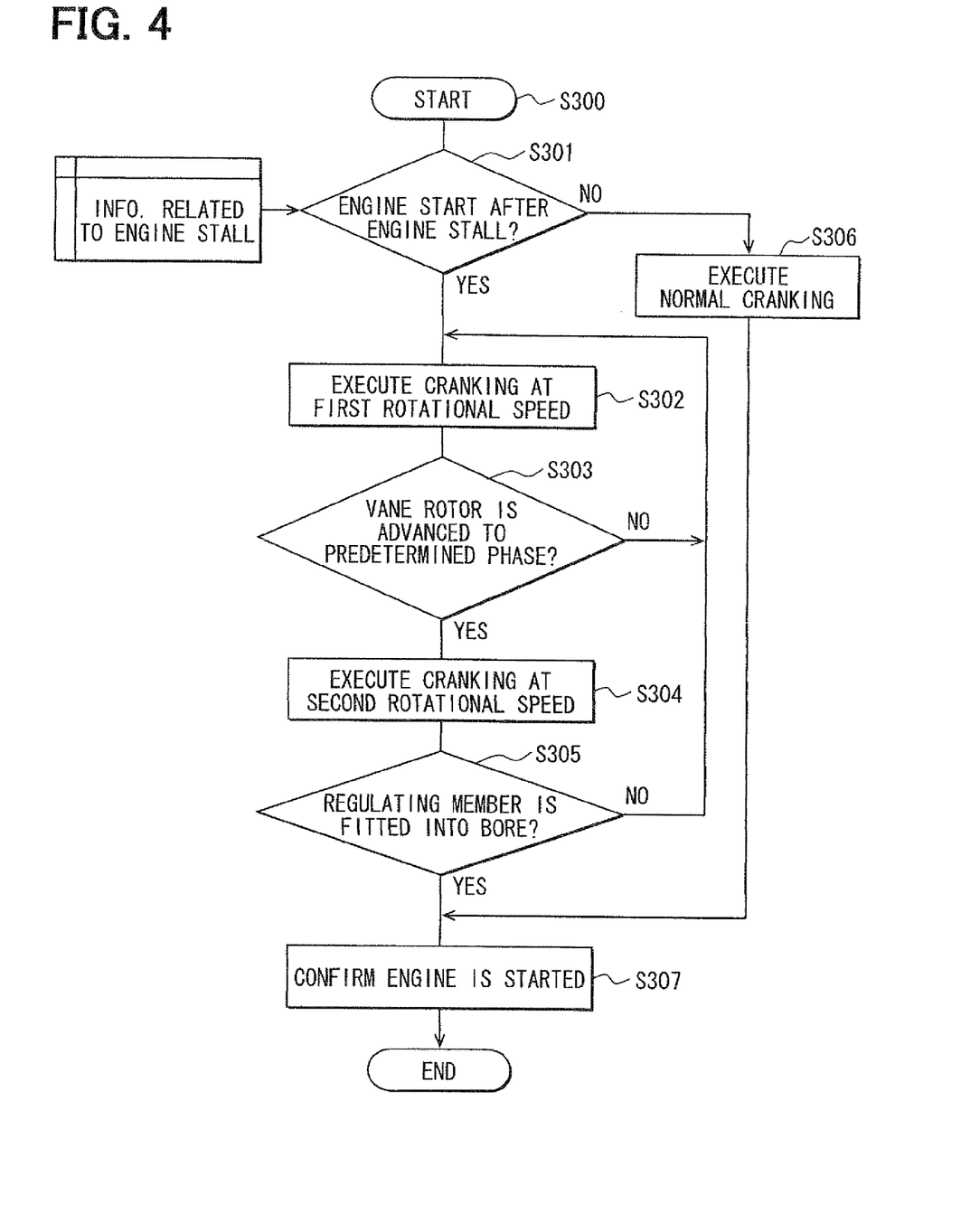
FIG. 4 is a flow chart illustrating an engine start procedure executed by the valve timing adjuster according to the first embodiment of the present invention.

Thus, in the present embodiment, during the starting of the engine 6, a procedure (S300) shown in FIG. 4 is executed. The ECU 4 executes step S300 as the engine start procedure when the ignition key is turned on. Please note that "step" is indicated by a symbol "S" in the present embodiment.

When S300 is started, control proceeds to S301.

At S301, the ECU 4 determines whether the present engine start is an engine start after the engine stall based on information related to the engine stall. In the present embodiment, the information related to the engine stall corresponds to, for example, "an OFF signal of the ignition key stored in the ECU 4 during stopping of the engine". The ECU 4 determines that the present engine start is "the engine start after the engine stall" when the OFF signal of the ignition key, which serves as the information during the previous stopping of the engine, is not stored. In contrast, when the OFF signal of the ignition key, which serves as the information during the previous stopping of the engine, is stored, it is determined that the engine was properly stopped in the previous operation, and thereby the ECU 4 determines that the present engine start is not "the engine start after the engine stall". When the ECU 4 determines that the present engine start is "the engine start after the engine stall" (corresponding to Y (YES) at S301), control proceeds to S302. In other words, when the ECU 4 determines that the present engine start occurs after the engine stall, control proceeds to S302. In contrast, when the ECU 4 determines that the present engine start is "not the engine start after the engine stall", corresponding to N (NO) at S301, the control proceeds to S306.

At S302, the ECU 4 controls the gear 61 of the starter motor 60 to mesh with the gear of the flywheel 82, and also the ECU 4 controls the starter motor 60 to rotate at a first rotational speed that is relatively high. Due to the above, the crankshaft 8, the housing 11, the vane rotor 16, and the camshaft 7 rotates at a relatively high rotational speed that corresponds to the first rotational speed. The rotational speed of the crankshaft 8 at the above operational state is referred to as a "first cranking rotational speed". When the crankshaft 8, the housing 11, the vane rotor 16, and the camshaft 7 rotate at the high speed, friction of the valve system applied to the vane rotor 16 (or the average cam torque applied to the vane rotor 16 in the retard direction) is reduced. As a result, the urging torque of the spring 26 rotates the vane rotor 16 relative to the housing 11 in the advance direction. Subsequently, control proceeds to S303.

At S303, the ECU 4 determines whether the vane rotor 16 is advanced to a predetermined phase. In other words, the ECU 4 determines at S303 whether "the vane rotor 16 has moved to a position that defines a predetermined rotation angle relative to the housing 11". For example, when the vane rotor 16 has moved to the position, the angle defined between the vane rotor 16 and the housing 11 corresponds to the predetermined rotation angle. When the ECU 4 determines that "the vane rotor 16 has moved to the position that defines the predetermined rotation angle relative to the housing 11", corresponding to Y at S303, control proceeds to S304. In contrast, when the ECU 4 determines that "the vane rotor 16 has not moved to the position that defines the predetermined rotation angle relative to the housing 11", corresponding to N at S303, control returns to S302. In other words, the procedure at S302 is repeated until the determination result in S303 becomes Y (YES).

At S304, the ECU 4 controls the rotation of the starter motor 60 such that the starter motor 60 rotates at a second rotational speed that is a relatively slow speed. In other words, the ECU 4 controls the rotation of the starter motor 60 such that the starter motor 60, which has been rotated at the first rotational speed, is instantly changed to rotate at the second rotational speed that is slower than the first rotational speed. As a result, the rotational speeds of the crankshaft 8, the housing 11, the vane rotor 16, and the camshaft 7 are quickly reduced. In the present embodiment, the rotational speed of the crankshaft 8 reduced as above is referred to as a "second cranking rotational speed". When the crankshaft 8, the housing 11, the vane rotor 16, and the camshaft 7 rotate at a lower speed, a fluctuation width of a phase of the vane rotor 16 is increased. For example, the fluctuation width of the phase of the vane rotor 16 is measured as an angular range between an advance end and a retard end of the fluctuation of the phase of the vane rotor 16. As a result, the vane rotor 16 becomes rotatably movable to a position, at which the stopper pin 30 is fittable into the bore 37 of the housing 11. Subsequently, control proceeds to S305.

It should be noted that a "predetermined rotation angle" at S303 corresponds to a rotation angle of the vane rotor 16 relative to the housing 11. For example, a "fitting angle" is defined as a rotation angle of the vane rotor 16 relative to the housing 11 when the stopper pin 30 is fitted into the bore 37 of the housing 11. Also, an angular difference is computed as a difference between (a) the "fitting angle" and (b) the rotational angle of the vane rotor 16 relative to the housing 11. In the above definition, the predetermined rotation angle corresponds to the rotational angle of the vane rotor 16 relative to the housing 11 when the above angular difference is smaller than a half of "the fluctuation width of the phase of the vane rotor 16 while the starter motor 60 rotates at the second rotational speed." The rotation angle of the vane rotor 16 relative to the housing 11 in the above state is detected based on the detection values of the crank angle sensor 65 and the cam angle sensor 66.

At S305, the ECU 4 determines whether the stopper pin 30 is fitted into the bore 37 of the housing 11. More specifically, the ECU 4 determines that the stopper pin 30 is fitted into the bore 37 of the housing 11 when "the vane rotor 16 is advanced to a position (full advance position), at which the stopper pin 30 is fitted into the bore 37." It should be noted that the position of the vane rotor 16 at the above state is detected based on values detected by the crank angle sensor 65 and the cam angle sensor 66. When it is determined that the stopper pin 30 is fitted into the bore 37, corresponding Y at S305, control proceeds to S307. In contrast, when it is determined that the stopper pin 30 is not fitted into the bore 37, corresponding N at S305, control returns to S302. In other words, the procedure for fitting the stopper pin 30 into the bore 37 is repeated.

It should be noted that when the determination at S305 becomes Y (YES), the vane rotor 16 has been located at the position (or the full advance position) suitable for starting the engine. After S305, the starting of the engine 6 is executed.

At S306, the ECU 4 executes a normal cranking. In other words, the ECU 4 brings the gear 61 of the starter motor 60 into mesh with the gear of the flywheel 82, and also the ECU 4 controls the starter motor 60 to rotate at the predetermined rotational speed. Subsequently, control proceeds to S307. At S306, the vane rotor 16 has been located at the position (full advance position), which is suitable for starting the engine, and then, after S306, the starting of the engine 6 is executed.

At S307, the ECU 4 confirms that the engine 6 has been started. Then, procedure of S300 is ended.

Next, a specific example of the operation of the valve timing adjuster 10 during the execution of the procedure in S300 will be described with reference to FIG. 5.

Figure 5A:
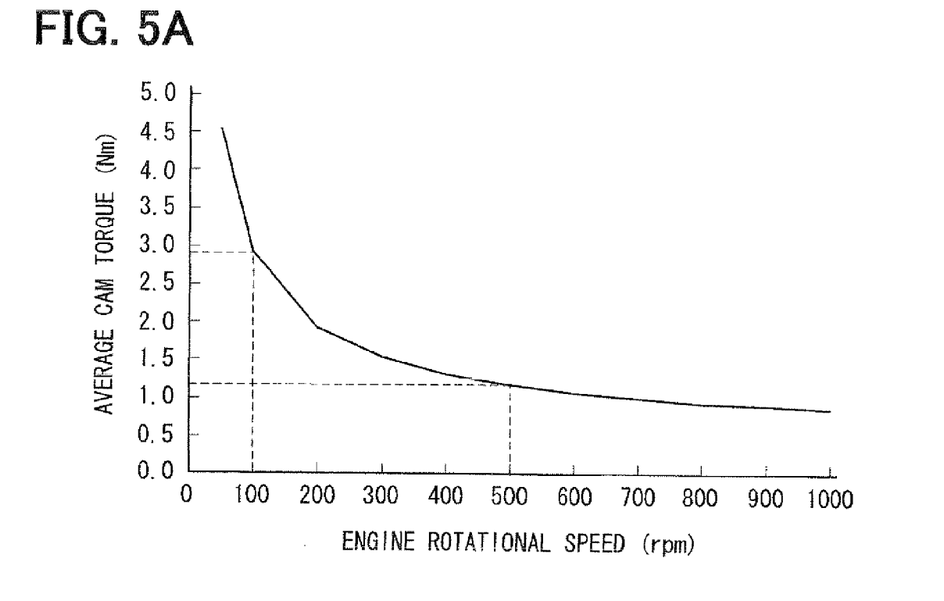
FIG. 5A is characteristic diagram illustrating a relation between an engine rotational speed and an average cam torque of the valve timing adjuster according to the first embodiment of the present invention.
Figure 5B:
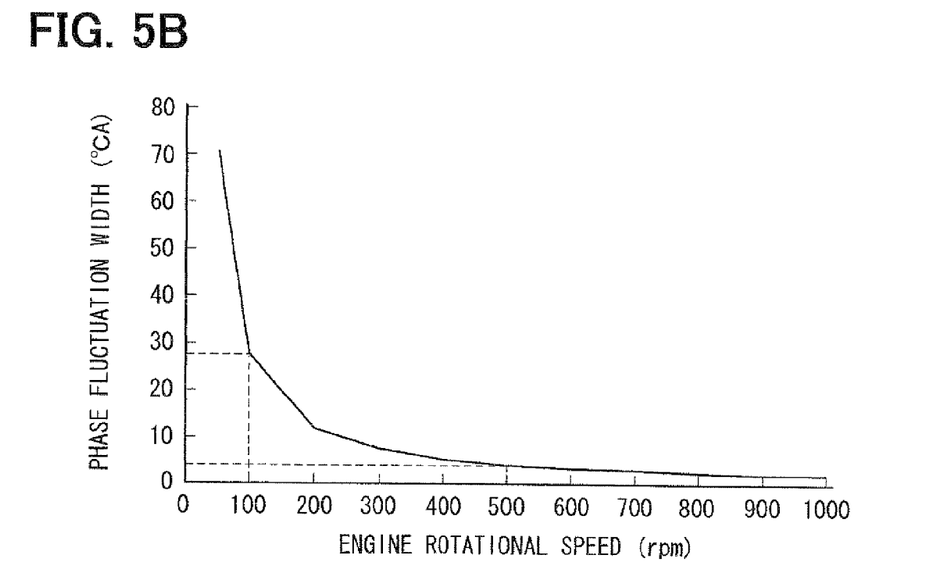
FIG. 5B is a characteristic diagram illustrating a relation between an engine rotational speed and a phase fluctuation width of the valve timing adjuster according to the first embodiment.

FIG. 5A is a characteristic diagram illustrating a relation between (a) the engine rotational speed (rotational speed of the crankshaft 8) and (b) the average cam torque applied to the vane rotor 16. It is apparent from FIG. 5A that the average cam torque applied to the vane rotor 16 becomes smaller with the increase of the rotational speed of the engine 6 (or, in other words, the rotational speed of the crankshaft 8). In contrast, FIG. 5B is another characteristic diagram illustrating a relation between (a) the engine rotational speed and (b) the fluctuation width of the phase of the vane rotor 16. It is apparent from FIG. 5B that the phase fluctuation width of the vane rotor 16 becomes smaller with the increase of the rotational speed of the engine 6 (or, in other words, the rotational speed of the crankshaft 8).

In the above, the specific configuration of the valve timing adjuster 10 will be described below. For example, a stopper pin fitting phase is defined as a phase difference between the full retard position and the full advance position of the vane rotor 16, and is set to 30° CA. The urging torque of the spring 26 at the full retard position is set to 1.6 Nm. A spring constant of the spring 26 is set to 0.02 Nm/° CA. Also, for example, the first rotational speed is set as the rotational speed of the starter motor 60 that causes the crankshaft 8 to rotate at 500 rpm (first cranking rotational speed). Also, the second rotational speed is set as the rotational speed of the starter motor 60 that causes the crankshaft 8 to rotate at 100 rpm (second cranking rotational speed). Also, in the example below, it is assumed that the engine stalls when the vane rotor 16 is at the full retard position.

During the restart of the engine after the engine stall, the ECU 4 causes the starter motor 60 to rotate at the first rotational speed. As a result, the crankshaft 8 is rotated at the first cranking rotational speed (500 rpm). Because the average cam torque in the above operational state is about 1.2 Nm (see FIG. 5A), the following equation is satisfied.

$$(1.6-1.2)/0.02=20 \qquad \text{(equation 1)}$$

As a result, the vane rotor 16 moves 20° CA from the full retard position in the advance direction. At this point, the vane rotor 16 is located at a position that is about 10° CA away from the full advance position (stopper pin fitting position). The ECU 4 controls the rotation of the starter motor 60 such that the rotational speed of the starter motor 60 quickly changes from the first rotational speed to the second rotational speed. As a result, the crankshaft 8 is quickly changed to rotate at the second cranking rotational speed (100 rpm). Because the phase fluctuation width of the vane rotor 16 in the above operational state is about 27° CA (see FIG. 5B), the vane rotor 16 moves (or the phase of the vane rotor 16 fluctuates) about 13.5° CA in the advance direction and in the retard direction. Due to the above, the vane rotor 16 is capable of reaching the full advance position (or the stopper pin fitting position), and thereby the stopper pin 30 is fitted into the bore 37.

In the present embodiment, by executing the procedure of S300, the starter motor 60 is caused to rotate at the first rotational speed, and thereby when "the vane rotor 16 has moved to a position that defines the predetermined rotation angle relative to the housing 11", the ECU 4 starts controlling the starter motor 60 to rotate at the second rotational speed. In the above example, "fitting angle" is 30° CA that is the rotation angle of the vane rotor 16 relative to the housing 11 when the stopper pin 30 is fitted into the bore 37. The predetermined rotation angle is the rotation angle of the vane rotor 16 relative to the housing 11 when the angular difference between "fitting angle" (30° CA) and the rotation angle of the vane rotor 16 becomes smaller than a half (13.5° CA) of "the fluctuation width (27° CA) of the phase of the vane rotor 16 while the starter motor 60 is rotated at the second rotational speed." In other words, the predetermined rotation angle is 20° CA computed as above. Thus, the angular difference between the predetermined rotation angle (20° CA) and the "fitting angle" (30° CA) is about 10° CA, and is smaller than 13.5° CA that is the half of the fluctuation width (27° CA).

Next, the following two comparison cases will be described below. In the first comparison case, the starter motor 60 is kept rotating at the first rotational speed from the start of the rotation. In the second comparison case, the starter motor 60 is kept rotating at the second rotational speed from the start of the rotation.

In the first comparison case, the crankshaft 8 rotates at the first cranking rotational speed (500 rpm), or in other words, at a constant speed. In the above case, it is known, based on the equation 1, that the vane rotor 16 moves about 20° CA from the full retard position in the advance direction. At this point, the vane rotor 16 is about 10° CA away from the full advance position (stopper pin fitting position). Because the phase fluctuation width of the vane rotor 16 in the above operational state is about 4° CA (see FIG. 5B), the vane rotor 16 moves (or the phase of the vane rotor 16 fluctuates) about 2° CA in the advance direction and in the retard direction. As a result, the vane rotor 16 will not reach the full advance position (stopper pin fitting position).

In contrast, in the second comparison case, where the starter motor 60 is kept rotating at the second rotational speed from the start of the rotation, the crankshaft 8 rotates at the second cranking rotational speed (100 rpm), or in other words, at the constant speed. The average cam torque in the above operational state is about 2.9 Nm (see FIG. 5A), and thereby is greater than the urging torque of the spring 26 (1.6 Nm). As a result, the vane rotor 16 will not move in the advance direction, and thereby is located at the full retard position. Because the phase fluctuation width of the vane rotor 16 in the above operational state is about 27° CA (see FIG. 5B), the vane rotor 16 moves (or the phase of the vane rotor 16 fluctuates) about 13.5° CA in the advance direction. As a result, the vane rotor 16 will not reach the full advance position (stopper pin fitting position).

As above, in the first and second comparison cases as below, the vane rotor 16 will not reach the full advance position, and thereby it is impossible to fit the stopper pin 30 into the bore 37. More specifically, in the first comparison case, "the starter motor 60 is kept rotating at the first rotational speed (constant rotational speed) from the start of the rotation". In the second comparison case, "the starter motor 60 is kept rotating at the second rotational speed (constant rotational speed) from the start of the rotation." Also, it is known from the above that "when the rotational speed of the starter motor 60 is controlled to gradually change from the first rotational speed to the second rotational speed," it is also impossible to fit the stopper pin 30 into the bore 37. The above is true because when the rotational speed of the starter motor 60 is gradually changed as above, the average cam torque is gradually increased, and thereby the vane rotor 16 is moved to the full retard position eventually.

As described above, in the present embodiment, the ECU 4 that serves as a control unit that is characterized in the following manner. During the restarting of the engine 6 in a state, where the stopper pin 30 is positioned out of the bore 37, after the engine 6 stops due to, for example, the engine stall, the ECU 4 controls the starter motor 60 to rotate at the first rotational speed, which is a relatively high speed. Subsequently, the starter motor 60 is quickly changed to rotate at the second rotational speed, which is a relatively low speed.

When the starter motor 60 is rotated at the first rotational speed, the crankshaft 8, the housing 11, the vane rotor 16, and the camshaft 7 rotate at the relatively high rotational speed that corresponds to the first rotational speed. When the crankshaft 8, the housing 11, the vane rotor 16, and the camshaft 7 rotate at the high speed, the friction of the valve system is decreased, and thereby the average cam torque is reduced. As a result, the urging torque of the spring 26 moves the vane rotor 16 a predetermined phase in the advance direction relative to the housing 11. Note that, when the housing 11, the vane rotor 16, and the camshaft 7 rotate at the relatively high speed, the fluctuation width of the phase of the vane rotor 16 is reduced. As a result, at this point, the stopper pin 30 may not be fitted into the bore 37 of the housing 11. Thus, in the present embodiment, while the starter motor 60 is rotated at the first rotational speed, the starter motor 60 is quickly changed to rotate at the second rotational speed, which is a relatively low speed. Due to the above, the rotational speeds of the crankshaft 8, the housing 11, the vane rotor 16, and the camshaft 7 quickly decrease. When the rotational speeds of the crankshaft 8, the housing 11, the vane rotor 16, and the camshaft 7 decrease as above, the friction of the valve system and the fluctuation width of the phase of the vane rotor 16 are increased accordingly. In the above operational state, the vane rotor 16 has already moved the predetermined phase in the advance direction relative to the housing 11. Thus, when the fluctuation width of the phase of the vane rotor 16 is increased at this point, the vane rotor 16 further moves to the position (or the phase), at which the stopper pin 30 is fittable into the bore 37. As a result, the stopper pin 30 is successfully fitted into or engaged with the bore 37 of the housing 11, and thereby the engine 6 becomes ready for the start.

As above, the rotational speed of the starter motor 60, the friction (average cam torque) of the valve system, and the fluctuation width of the phase of the vane rotor 16 are considered in the present embodiment. Thus, by controlling the rotational speed of the starter motor 60, the restart of the engine after the engine stall is reliably achieved in the present embodiment. As a result, in the present embodiment, it is possible to improve the reliability of the restart of the engine after the engine stall by a simple configuration without employing a complex mechanism.

Also, in the present embodiment, "when the controlling of the starter motor 60 to rotate at the first rotational speed has moved the vane rotor 16 to a position that defines the predetermined rotation angle relative to the housing 11", the ECU 4 starts controlling the starter motor 60 to rotate at the second rotational speed. The above predetermined rotation angle is a rotation angle of the vane rotor 16 relative to the housing 11, and for example, the "fitting angle" is the rotation angle of the vane rotor 16 relative to the housing 11 when the stopper pin 30 is fitted into the bore 37 of the housing 11. The angular difference is computed as a difference between (a) the "fitting angle" and (b) the rotational angle of the vane rotor 16 relative to the housing 11. In the above definition, the predetermined rotation angle corresponds to the rotational angle of the vane rotor 16 relative to the housing 11 when the above angular difference is smaller than the half of "the fluctuation width of the phase of the vane rotor 16 while the starter motor 60 rotates at the second rotational speed." Thus, "when the vane rotor 16 has moved to the position that defines the predetermined rotation angle relative to the housing 11", the ECU 4 changes the rotational speed of the starter motor 60 from the first rotational speed to the second rotational speed. As a result, it is possible to successfully move the vane rotor 16 to the position, at which the stopper pin 30 is fittable into the bore 37. As above, in the present embodiment it is possible to change the rotational speed of the starter motor 60 at timing suitable for the stopper pin 30 to be fitted into the bore 37. As a result, it is possible to further improve the reliability of the restart of the engine after the engine stall.

Furthermore, in the present embodiment, the valve timing adjuster 10 includes the crank angle sensor 65 and the cam angle sensor 66. For example, the crank angle sensor 65 serves as first detecting means for detecting the rotation angle of the crankshaft 8, and the cam angle sensor 66 serves as second detecting means for detecting the rotation angle of the camshaft 7. Also, the ECU 4 detects that "the vane rotor 16 has moved to the position that defines the predetermined rotation angle relative to the housing 11" based on the rotation angle of the crankshaft 8 and the rotation angle of the camshaft 7 respectively detected by the crank angle sensor 65 and the cam angle sensor 66. In the above, it is possible to detect the relative rotation angle of the vane rotor 16 relative to the housing 11 based on the angular difference (phase difference) between the rotation angle of the crankshaft 8 and the rotation angle of the camshaft 7. Thus, in the present embodiment, by employing the crank angle sensor 65 and the cam angle sensor 66, it is possible to accurately detect the relative rotation angle of the vane rotor 16 relative to the housing 11. As a result, it is possible to accurately detect the timing of changing the rotational speed of the starter motor 60. In other words, it is possible to accurately detect the timing suitable for fitting the stopper pin 30 into the bore 37. Therefore, it is possible to further improve the reliability of restarting the engine after the engine stall.

Second Embodiment

A valve timing adjuster according to the second embodiment of the present invention will be described with reference to FIG. 6. In second embodiment, the process of controlling the starter motor 60 during the abnormal operation (the restart of the engine after the engine stop due to the engine stall) is different from the process in the first embodiment.

Figure 6:
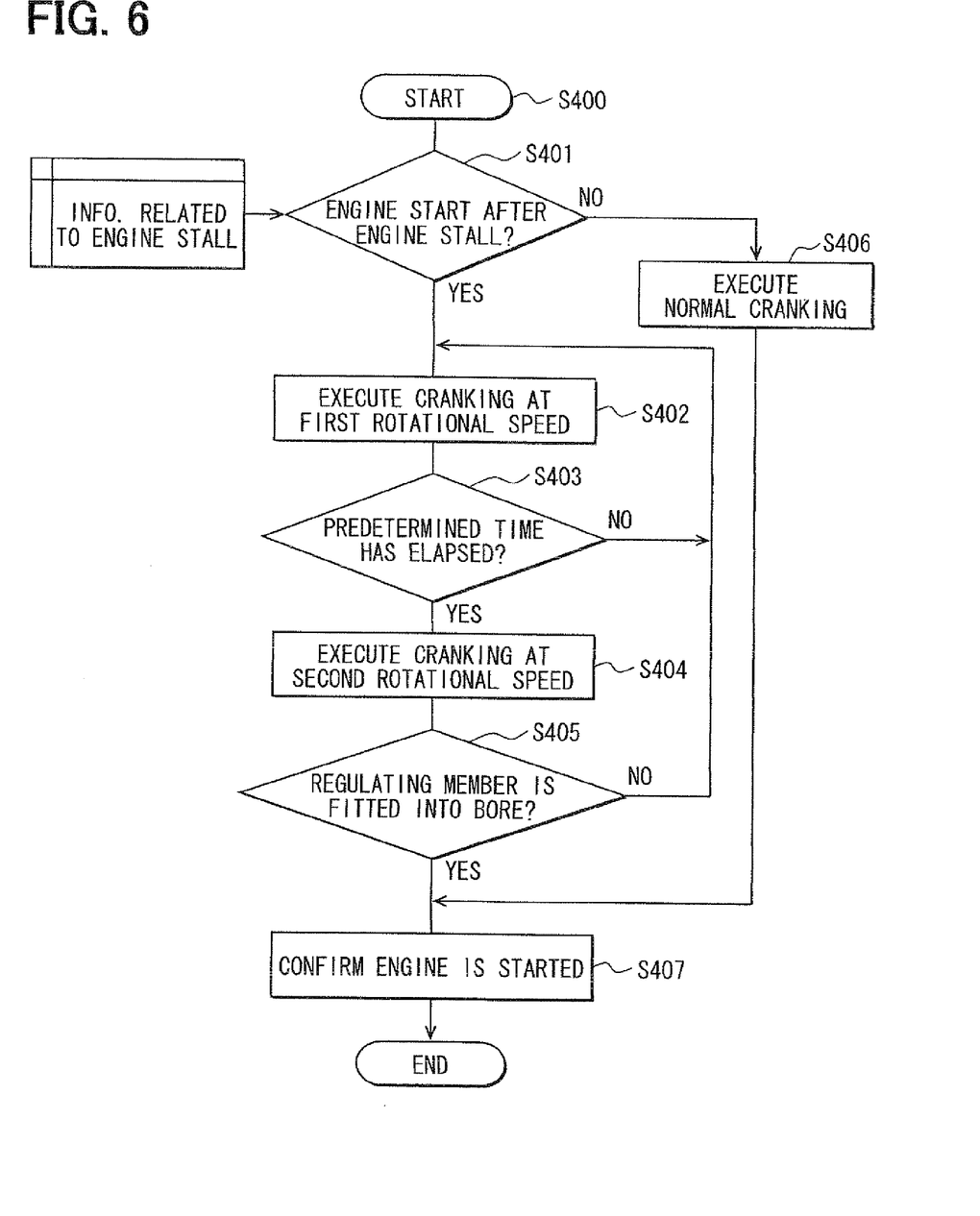
FIG. 6 is a flow chart illustrating the engine start procedure by a valve timing adjuster according to the second embodiment of the present invention.

In the present embodiment, a procedure (S400) shown in FIG. 6 is executed during the starting of the engine 6. When the ignition key is turned on, the ECU 4 executes the engine start procedure of step S400, which serves as the engine start procedure.

When the procedure of S400 is started, control proceeds to S401.

At S401, the ECU 4 determines whether the present engine start is the engine start after the engine stall based on the information related to the engine stall. In the present embodiment, the information related to the engine stall indicates, for example, "the OFF signal of the ignition key stored in the ECU 4 during stopping of the engine." The ECU 4 determines that the present engine start is "the engine start after the engine stall" when the ECU 4 does not store the OFF signal of the ignition key as the information during the previous stopping of the engine. In contrast, the ECU 4 determines that the present engine start is "not the engine start after the engine stall" when the ECU 4 stores the OFF signal of the ignition key as the information during the previous stopping of the engine because the stored OFF signal indicates the proper stopping of the engine in the previous operation of the engine. When the ECU 4 determines that the present engine start is "the engine start after the engine stall", corresponding to Y at S401, control proceeds to S402. In contrast, when the ECU 4 determines that the present engine start is not "the engine start after the engine stall", corresponding to N at S401, control proceeds to S406.

At S402, the ECU 4 controls the gear 61 of the starter motor 60 to mesh with the gear of the flywheel 82, and also the ECU 4 controls the starter motor 60 to rotate at the first rotational speed that is a relatively high speed. Due to the above, the crankshaft 8, the housing 11, the vane rotor 16, and the camshaft 7 rotate at a relatively high rotational speed that corresponds to the first rotational speed. In the present embodiment, the rotational speed of the crankshaft 8 in the above operational state is referred to as a "first cranking rotational speed". When the crankshaft 8, the housing 11, the vane rotor 16, and the camshaft 7 rotate high speed, the friction of the valve system (average cam torque in the retard direction) applied to the vane rotor 16 decreases, and thereby the urging torque of the spring 26 moves the vane rotor 16 relative to the housing 11 in the advance direction. Then, control proceeds to S403.

At S403, the ECU 4 determines whether a predetermined time has elapsed. In other words, the ECU 4 determines whether "a predetermined time has elapsed since a time, at which the ECU 4 has started controlling the starter motor 60 to rotate at the first rotational speed." When it is determined that the predetermined time has elapsed, corresponding to Y at S403, control proceeds to S404. In contrast, when it is determined that the predetermined time has not elapsed, corresponding to N at S403, control returns to S402. In other words, the procedure in S402 is repeated until the determination at S403 becomes Y (YES).

At S404, the ECU 4 controls the starter motor 60 to rotate at the second rotational speed, which is the relatively low speed. In other words, the ECU 4 controls the rotation of the starter motor 60 such that the starter motor 60, which has rotated at the first rotational speed, is quickly changed to rotate at the second rotational speed. In the above, the first rotational speed is the relatively high speed, and the second rotational speed is lower than the first rotational speed and is the relatively low speed. Due to the above, the rotational speed of the crankshaft 8, the housing 11, the vane rotor 16, and the camshaft 7 quickly decrease. In the present embodiment, the rotational speed of the crankshaft 8 in the above operational state is referred to as a "second cranking rotational speed". When the crankshaft 8, the housing 11, the vane rotor 16, and the camshaft 7 rotate at a slow speed, the fluctuation width of the phase of the vane rotor 16 increases. As a result, the vane rotor 16 is movable to a position, at which the stopper pin 30 is fittable into the bore 37 of the housing 11. Subsequently, control proceeds to S405.

It should be noted that the "predetermined time" at S403 allows "the vane rotor 16 to move to the position that defines the predetermined rotation angle relative to the housing 11 while the starter motor 60 rotates at the first rotational speed". In the present embodiment, the predetermined time is determined based on the temperature of coolant and the temperature of hydraulic oil. For example, a "fitting angle" is defined as a rotation angle of the vane rotor 16 relative to the housing 11 when the stopper pin 30 is fitted into the bore 37 of the housing 11. Also, an angular difference is computed as a difference between (a) the "fitting angle" and (b) the rotational angle of the vane rotor 16 relative to the housing 11. In the above definition, the predetermined rotation angle corresponds to the rotational angle of the vane rotor 16 relative to the housing 11 when the above angular difference is smaller than a half of "the fluctuation width of the phase of the vane rotor 16 while the starter motor 60 rotates at the second rotational speed." In the present embodiment, the predetermined time is set based on the temperature of coolant and the temperature of hydraulic oil, which are detected by the coolant temperature sensor 67 and the oil temperature sensor 68 without using the crank angle sensor 65 and the cam angle sensor 66.

At S405, the ECU 4 determines whether the stopper pin 30 has been fitted into the bore 37 of the housing 11. In other words, the ECU 4 determines that the stopper pin 30 has been fitted into the bore 37 when "the vane rotor 16 is advanced to a position (full advance position), where the stopper pin 30 is fittable into (engageable with) the bore 37". It should be noted that the position of the vane rotor 16 in the above operational state is detected based on the detection values of the crank angle sensor 65 and the cam angle sensor 66. When it is determined that the stopper pin 30 has been fitted into the bore 37, corresponding to Y at S405, control proceeds to S407. In contrast, when it is determined that the stopper pin 30 has not been fitted into the bore 37, corresponding to N at S405, control returns to S402. In other words, the attempt for fitting the stopper pin 30 into the bore 37 is repeated.

It should be noted that when the determination at S405 becomes Y (YES), it is estimated that the vane rotor 16 is located at the position (full advance position) suitable for the starting of the engine. Thus, after S405, the starting operation of the engine 6 is executed.

At S406, the ECU 4 executes the normal cranking. In other words, the ECU 4 brings the gear 61 of the starter motor 60 into mesh with the gear of the flywheel 82, and also the ECU 4 controls the starter motor 60 to rotate at the predetermined rotational speed. Subsequently, control proceeds to S407. At S406, because the vane rotor 16 is located at the position (full advance position) suitable for starting the engine, the operation of starting the engine 6 is executed after S406.

At S407, the ECU 4 confirms that the engine 6 has been started. Subsequently, the whole procedure of S400 is ended.

As described above, in the present embodiment, the ECU 4 firstly controls the starter motor 60 to rotate at the first rotational speed, and when "the predetermined time has elapsed", the starter motor 60 is quickly changed to rotate at the second rotational speed. In the present embodiment, when the predetermined time has elapsed, it is estimated that "the vane rotor 16 has moved to the position that defines the predetermined rotation angle relative to the housing 11". Thus, at the above timing, the rotational speed of the starter motor 60 is quickly changed from the first rotational speed to the second rotational speed. Due to the above, it is possible to effectively fit the stopper pin 30 into the bore 37. Thus, in the present embodiment, similarly to the first embodiment, it is possible to change the rotational speed of the starter motor 60 at timing suitable for fitting the stopper pin 30 into the bore 37. As a result, it is possible to improve the reliability of restarting the engine after the engine stall.

Also, in the present embodiment, the ECU 4 detects that "the predetermined time has elapsed" based on the temperature detected by at least one of the coolant temperature sensor 67 and the oil temperature sensor 68. More specifically, the coolant temperature sensor 67 serves as coolant temperature detecting means, and the oil temperature sensor 68 serves as working fluid temperature detecting means. For example, the ECU 4 has a map indicating a relation among (a) temperature of coolant, (b) temperature of hydraulic oil, and (c) "a duration of time that allows the rotation angle of the vane rotor 16 relative to the housing 11 becomes the predetermined rotation angle while the starter motor 60 rotates at the first rotational speed." Thus, the ECU 4 sets the predetermined time with reference to the map. In other words, the ECU 4 sets the duration, during which the starter motor 60 rotates at the first rotational speed, based on the temperature of coolant and the temperature of hydraulic oil in the present embodiment. Due to the above, it is possible to accurately detect the timing of changing the rotational speed of the starter motor 60 or the timing of fitting the stopper pin 30 into the bore 37. As a result, it is possible to further improve the reliability of restarting the engine after the engine stall.

In the procedure of S403 in the second embodiment, without using the crank angle sensor 65 and the cam angle sensor

66 that are employed in the first embodiment, it is possible to reliably detect the timing of changing the rotational speed of the starter motor 60 as above.

Other Embodiment

In the other embodiment of the present invention, the valve timing adjuster may not include the coolant temperature detecting means and the working fluid temperature detecting means. As described in the first embodiment, it is possible to detect "timing of changing the rotational speed of the electric motor" by using the first detecting means and the second detecting means.

The present invention may be applied to another valve timing adjuster, in which a vane rotor is positioned between the full advance position and the full retard position when the vane rotor is fitted with the regulating member.

Also, the present invention may be applicable to a valve timing adjuster that adjusts the timing of opening and closing the intake valve.

As above, the present invention is not limited to the above embodiments, and is applicable to various modifications provided that the modifications do not deviate from the gist of the present invention.

Additional advantages and modifications will readily occur to those skilled in the art. The invention in its broader terms is therefore not limited to the specific details, representative apparatus, and illustrative examples shown and described.

What is claimed is:

1. A valve timing adjuster for adjusting timing of opening and closing at least one of an intake valve and an exhaust valve by changing a phase between a drive shaft of an internal combustion engine and a driven shaft that is driven by a driving force of the drive shaft, the driven shaft opening and closing the at least one of the intake valve and the exhaust valve, the valve timing adjuster comprising:
    a housing that is rotatable synchronously with one of the drive shaft and the driven shaft, the housing having a receiving chamber extending over a predetermined angular range in a rotational direction;
    a vane rotor that is rotatable synchronously with the other one of the drive shaft and the driven shaft, wherein:
        the vane rotor has a vane provided at an outer periphery of the vane rotor;
        the vane divides the receiving chamber into a retard chamber and an advance chamber; and
        the vane rotor is rotatable relative to the housing in a retard direction and an advance direction based on pressure of working fluid supplied to the retard chamber and the advance chamber;
    an urging member that has one end engaged with the vane rotor and has the other end engaged with the housing, the urging member urging the vane rotor in the advance direction relative to the housing;
    a regulating member that is longitudinally reciprocably received within a hole formed at the vane, wherein the regulating member regulates rotation of the vane rotor relative to the housing when the regulating member is fitted into a bore formed at an inner wall of the housing; and
    a control unit configured to control rotation of an electric motor that rotates the drive shaft, wherein:
    when the internal combustion engine stops in an operational state, where the regulating member is positioned out of the bore, the control unit restarts the internal combustion engine by controlling the electric motor in the following manner:
    firstly, the electric motor is controlled to rotate at a first rotational speed, which is a relatively high speed; and
    subsequently, the electric motor is quickly changed to rotate at a second rotational speed, which is a relatively low speed.

2. The valve timing adjuster according to claim 1, wherein:
    the control unit starts controlling the electric motor to rotate at the second rotational speed when the controlling of the electric motor to rotate at the first speed has moved the vane rotor to a position that defines a predetermined rotation angle relative to the housing.

3. The valve timing adjuster according to claim 2, further comprising:
    first detecting means for detecting a rotation angle of the drive shaft; and
    second detecting means for detecting a rotation angle of the driven shaft, wherein:
    the control unit detects that the vane rotor has moved to the position that defines the predetermined rotation angle relative to the housing, based on the rotation angle of the drive shaft, which is detected by the first detecting means, and the rotation angle of the driven shaft, which is detected by the second detecting means.

4. The valve timing adjuster according to claim 1, wherein:
    the control unit starts controlling the electric motor to rotate at the second rotational speed when a predetermined time has elapsed since a time, at which the control unit has started controlling the electric motor to rotate at the first rotational speed.

5. The valve timing adjuster according to claim 4, further comprising:
    coolant temperature detecting means for detecting temperature of coolant for cooling the internal combustion engine; and
    working fluid temperature detecting means for detecting temperature of the working fluid, wherein:
    the control unit detects that "the predetermined time has elapsed" based on at least one of the temperature of the coolant and the temperature of the working fluid.

* * * * *